(12) United States Patent
Huynh et al.

(10) Patent No.: US 12,062,367 B1
(45) Date of Patent: Aug. 13, 2024

(54) MACHINE LEARNING TECHNIQUES FOR PROCESSING VIDEO STREAMS USING METADATA GRAPH TRAVERSAL

(71) Applicant: Amazon Technologies, Inc., Seattle, WA (US)

(72) Inventors: Steve Huynh, Seattle, WA (US); Erik Martin Zigman, Sammamish, WA (US); Ronald Diaz, Lynwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 264 days.

(21) Appl. No.: 17/360,903

(22) Filed: Jun. 28, 2021

(51) Int. Cl.
| | |
|---|---|
| G10L 15/18 | (2013.01) |
| G06F 16/783 | (2019.01) |
| G06F 16/901 | (2019.01) |
| G06N 20/00 | (2019.01) |
| G10L 15/06 | (2013.01) |
| G10L 15/183 | (2013.01) |
| H04N 21/439 | (2011.01) |
| H04N 21/44 | (2011.01) |

(52) U.S. Cl.
CPC ........ *G10L 15/1815* (2013.01); *G06F 16/783* (2019.01); *G06F 16/9024* (2019.01); *G06N 20/00* (2019.01); *G10L 15/063* (2013.01); *G10L 15/1822* (2013.01); *G10L 15/183* (2013.01); *H04N 21/4394* (2013.01); *H04N 21/44008* (2013.01)

(58) Field of Classification Search
CPC ............... G10L 15/1815; G10L 15/063; G10L 15/1822; G10L 15/183; G06F 16/783; G06F 16/9024; G06N 20/00
See application file for complete search history.

(56) References Cited

U.S. PATENT DOCUMENTS

| | | | | |
|---|---|---|---|---|
| 10,121,517 | B1* | 11/2018 | Singer | G06F 16/48 |
| 10,178,422 | B1* | 1/2019 | Panchaksharaiah | G11B 27/00 |
| 10,187,677 | B1* | 1/2019 | Panchaksharaiah | |
| | | | | H04N 21/4532 |
| 2009/0326947 | A1* | 12/2009 | Arnold | G06Q 30/02 |
| | | | | 707/999.005 |
| 2015/0365448 | A1* | 12/2015 | Stifelman | G06F 11/3086 |
| | | | | 709/204 |
| 2018/0005037 | A1* | 1/2018 | Smith, IV | H04N 21/23439 |
| 2018/0046851 | A1* | 2/2018 | Kienzle | G06F 3/167 |

(Continued)

FOREIGN PATENT DOCUMENTS

| | | | | |
|---|---|---|---|---|
| CA | 2977185 | A1 * | 2/2018 | G06F 17/153 |
| CA | 3122729 | A1 * | 6/2020 | A61B 5/16 |

(Continued)

*Primary Examiner* — Anne L Thomas-Homescu
(74) *Attorney, Agent, or Firm* — Eversheds Sutherland (US) LLP

(57) ABSTRACT

Systems, devices, and methods are provided for processing video streams. Metadata is extracted from an input video stream and processed using a video stream analyzer. The extracted metadata may be correlated along a time dimension. A metadata graph is generated based on relationships between various information present in the video stream as well as external fact sources. Machine learning models may be trained to receive an input phrase, determine a graph query from the input, and determine an output by traversing the metadata graph according to the graph query.

20 Claims, 9 Drawing Sheets

(56) References Cited

U.S. PATENT DOCUMENTS

| | | | |
|---|---|---|---|
| 2018/0307993 A1* | 10/2018 | Chawla | G06N 20/00 |
| 2019/0156821 A1* | 5/2019 | Zamora Duran | G10L 15/24 |
| 2019/0205762 A1* | 7/2019 | Sher | G06N 3/082 |
| 2019/0294668 A1* | 9/2019 | Goel | H04N 21/4788 |
| 2019/0341050 A1* | 11/2019 | Diamant | G06V 40/172 |
| 2019/0370587 A1* | 12/2019 | Burachas | G06T 11/60 |
| 2020/0169591 A1* | 5/2020 | Ingel | G10L 13/08 |
| 2020/0184965 A1* | 6/2020 | Costa Villas Bôas Segura | G10L 15/22 |
| 2020/0189501 A1* | 6/2020 | Kim | G10L 15/07 |
| 2020/0213680 A1* | 7/2020 | Ingel | H04N 21/44008 |
| 2020/0226454 A1* | 7/2020 | Cambier | G06F 5/012 |
| 2020/0278991 A1* | 9/2020 | Canter | G06F 40/166 |
| 2020/0312348 A1* | 10/2020 | Shao | G10L 15/1815 |
| 2020/0320375 A1* | 10/2020 | Abuhatzera | G06F 7/5443 |
| 2020/0380030 A1* | 12/2020 | Colas | G06F 16/73 |
| 2020/0380367 A1* | 12/2020 | Gupta | G06F 18/2148 |
| 2020/0410292 A1* | 12/2020 | Trim | G06N 20/00 |
| 2021/0081201 A1* | 3/2021 | Maiyuran | G06F 9/3893 |
| 2021/0174497 A1* | 6/2021 | Yoo | G06F 18/213 |
| 2021/0248376 A1* | 8/2021 | Zhao | G06V 20/49 |
| 2021/0286603 A1* | 9/2021 | Baughman | G06N 3/065 |
| 2021/0406293 A1* | 12/2021 | Nahamoo | G06F 40/284 |
| 2022/0114463 A1* | 4/2022 | Tumuluri | G06F 16/3329 |
| 2022/0122268 A1* | 4/2022 | Tsun | G06V 20/35 |
| 2022/0398279 A1* | 12/2022 | Aher | G06F 3/0481 |

FOREIGN PATENT DOCUMENTS

| | | | | |
|---|---|---|---|---|
| WO | WO-2017124116 A1 * | 7/2017 | | |
| WO | WO-2020081872 A1 * | 4/2020 | | H04N 21/4394 |
| WO | WO-2020226617 A1 * | 11/2020 | | G06F 3/167 |
| WO | WO-2020263711 A1 * | 12/2020 | | G06F 16/3329 |

* cited by examiner

MACHINE LEARNING TECHNIQUES FOR PROCESSING VIDEO STREAMS USING METADATA GRAPH TRAVERSAL

BACKGROUND

Processing video streams to determine contextually relevant information for a user may be a challenging task. For example, determining how and what information is encoded in a video stream and how such information interrelates with other information may be challenging. Furthermore, information may be contextually relevant or irrelevant based on other considerations. It may be difficult to determine what kind of information is contextually relevant in formulating a response to a question asked by an individual, and it may furthermore be difficult to create meaningful questions and/or answers based on information available to a system.

Figure 1:
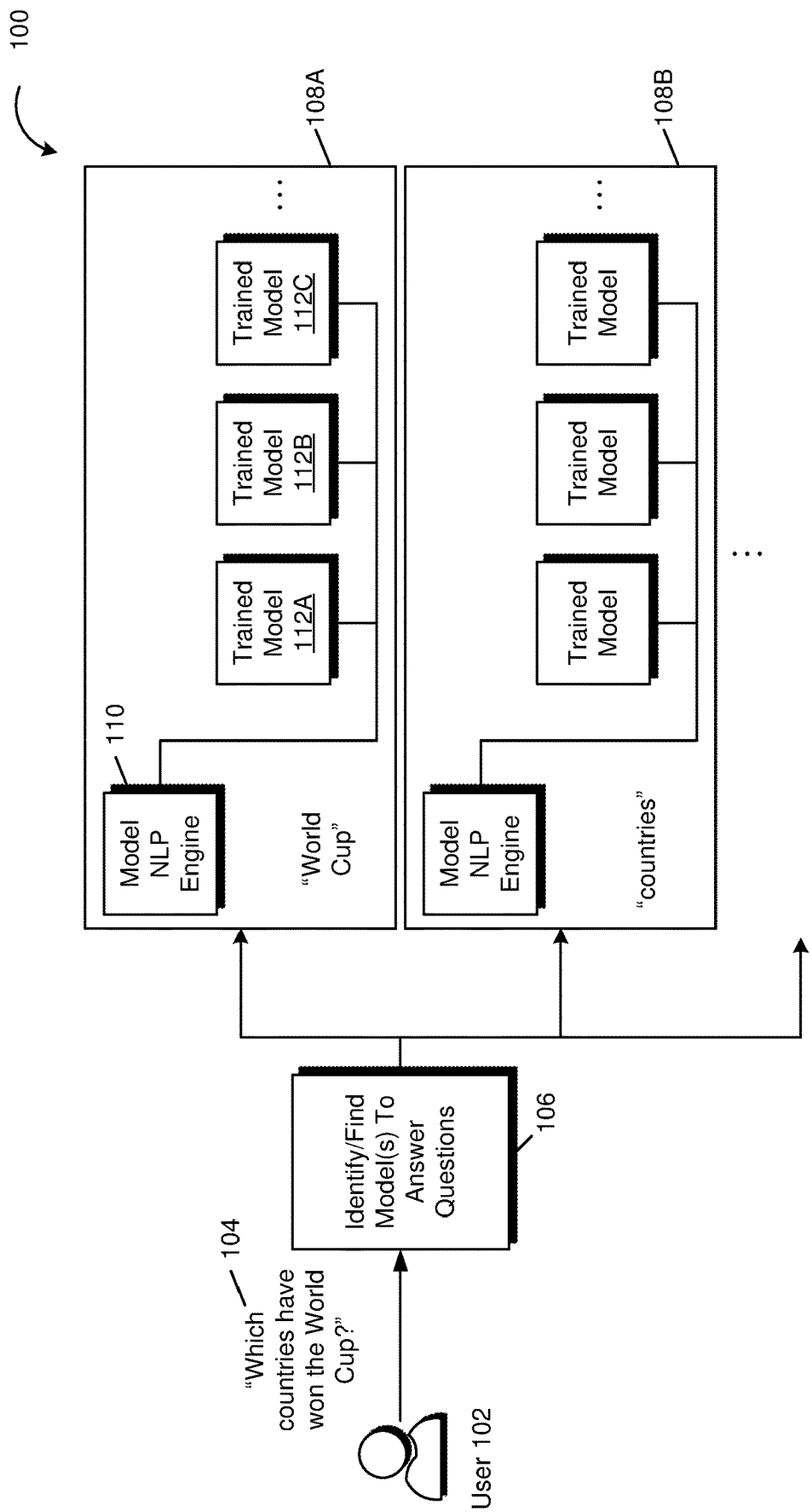
FIG. 1 illustrates a diagram in which a set of natural language processing (NLP) engines are utilized to process a user interaction, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for processing video streams using machine learning models trained based on metadata graph traversal techniques. In various embodiments, input audio (e.g., human speech) is received via a microphone or other audio capture device, and an NLP engine is used to identify and utilize the trained models to determine answers to user questions, which may rely on contextual and/or topical information. For example, a user may ask a question, "Which countries have won the World Cup?" and the question may be processed according to the techniques described in greater detail below, for example, as discussed in connection with FIG. 1. Video streams may be composed of frames of visual content that can be processed as inputs to a video stream analyzer. Where multiple video stream analyzers are available to be used, an input type registry may be used to determine which among multiple video stream analyzers should be selected and retrieved based on input type of the video stream.

Upon determining a suitable video stream analyzer for a video stream (e.g., based on input type), the video stream may be processed through the selected video stream analyzer to extract facts and metadata. Metadata may refer to information encoded in the video stream or portions thereof that are processed by video stream analyzer. The video stream analyzer may be segmented and trained to process information relating to a specific sport or topic. For example, a video stream such as the video stream segment of interest depicted in FIG. 2 may be processed by a video stream analyzer to extract various facts and time segments relating to such facts. For example, a video stream analyzer may determine that a ball is being thrown in from 00:01-00:04, that a ball was received by PlayerX, determine that the ball was received by PlayerX with a header from 00:05-00:06, and so on.

Fact sources can provide additional informational factual data that can be associated with metadata extracted from the video stream. For example, fact sources may provide historical facts relating to the specific actors depicted in the input video stream (e.g., information regarding previous goals scored by PlayerX) as well as related historical facts based on context (e.g., determining a different player has been assisted by a greater number of different players) and both the historical facts obtained from an external fact source as well information processed from the video stream are used to determine how to traverse the metadata graph to process user questions. In at least some embodiments, fact sources are encoded in the time series format utilized by downstream components. In some embodiments, fact sources are external data sources accessed by a service provider of environment via a communications network such as the Internet.

Video stream analyzers may be utilized to determine facts and metadata from input video streams in conjunction with fact sources. For example, and according to various embodiments, fact sources may include historical factual information on corner kicks and there may be a corner kick video stream analyzer trained to process video content for corner kicks and generate facts and metadata from video content of this specific type. Accordingly, when a corner kick is detected in an input video stream, metadata from factual sources as well as metadata determined by the corner kick video stream analyzer may be overlapped and used to expose fats as to who scored on corner kicks, who performed assists, when those kicks occurred, who was the goalkeeper was, and so on. Associations may be made between various metadata points in a semantically coherent manner and combined to identify facts and intersections thereof that are meaningful and engaging to viewers.

Upon having obtained a segment of the input video stream, factual sources may be queried, and one or more metadata outputs determined from an appropriate video input analyzer as determined based on the input type. The outputs from the analyzer and/or fact sources may be combined to form the corpus of facts that are being extracted from the segment. For example, a video stream analyzer may be used to extract various contemporaneous facts from an input video stream, such as the fact that PlayerX scored a goal on a corner kick in a highlight segment. Fact sources may be used to determine that the goal was the eighth goal scored by PlayerX on a corner kick, and furthermore, may relate to other facts, such as the fact that PlayerX has the second most goals scored off corner kicks in the league this season.

Facts and metadata may be extracted from the input video stream by use of a suitable video stream analyzer (e.g., selected from a plurality of video stream analyzers based on input type registry) and background facts provide by fact sources. Facts and metadata may be formatted with time series information, for example, as described in connection with FIG. 1. Facts and metadata depicted in FIG. 4 as M1, M2, M3, and M4 are illustrative and serve to show how discrete facts and metadata may be determined thus far, but without additional context around the nature of how they are interrelated.

Relationships between facts and original input may be created and packaged as new input in a recursive manner. When an initial set of facts are generated, they are used in a feedforward recursive system with a max recursion or max order, wherein the output generated from a first iteration is used as the input until a max order has been reached. In some cases, the recursive system terminates when there is no more complexity that can be extracted from the system. In various embodiments, the recursion terminates when no additional transforms are possible. Relationships may be represented as directed edges that connect one piece of metadata with another by time segment. For example, M1 may be related to M2, M3, and M4 based on the outbound arrows between M1 and each of M2, M3, and M4.

Once this information is fed into the system, a level of abstraction attempts to refine the input to its most granular information by running it through an analyzer that can be loaded with any other model or algorithm to produce a set of raw images or notions. These fragments of information can exist outside of the time dimension of the segment or may intersect with the time dimension non-linearly. Some of these metadata may make sense when applied to their factual context. When consuming these fragments, any N variety of analyzers can be registered (e.g., by a human user with an expected input and output) and after multiple processing iterations, generate a dynamic metadata graph that expresses the rich relationship between the data. Individual metadata for facts may be semantically linked to other metadata or facts by using analyzers to determine edges between two or more metadata or facts. Metadata or facts may be interrelated at specific time segments. The metadata graph may be implemented in accordance with techniques described in connection with FIGS. 5, 7, and elsewhere in this disclosure.

A metadata graph may encode key facts and metadata and include information regarding various properties or aspects of a segment of multimedia. FIG. 5, as discussed below, may depict facts and metadata extracted for a highlighted segment where PlayerX scored on a header, for example, as described in connection with examples discussed in connection with FIG. 2. A metadata graph may comprise graph nodes that correspond to key facts and metadata relating to the highlight. These core facts may include information regarding PlayerX, goal attempts, and more. In some embodiment, information encoded in a node, such as a player's weight or current age, may be information that is obtained from a historical fact source, such as those discussed in connection with FIG. 4. Edges between them may be viewed as annotations on the edge showing how the interrelated data can be structure. Conceptually, a video may have, for each different point in the video, associated annotations for the actions that are unfolding in the video at each time segment. These common annotations may be aggregated and taken to create a single model that represents all of the different multiple occurrences of actions and events happening in the multimedia stream. In at least one embodiment, these events are correlated temporally into a graph representation that removes the time dimensionality by creating additional temporal nodes to reflect the temporal dimension. Time segments may be encoded as temporal nodes of the graph wherein the edges to and from temporal nodes may be traversed to describe the sequence of events that occurred as a time series. Taken together, the nodes can be used to focus on the actions of a specific player over a segment of time, focus on all of the interactions with the ball that occurred over the video clip, and so on. Correlations between two nodes may indicate stronger or weaker statistical relationships between two nodes. For example, a stronger correlation between two nodes may indicate a stronger statistical relationship, and a weaker correlation between two nodes may indicate a weaker statistical relationship. As an example, a node for a player may have outward edges to both a first time segment for a passing action and a second time segment for a shooting action where it may be ambiguous as to whether the player is attempting a shot or a pass to a team mate near the goal, with weights of the outward edges to the actions being proportional to how statically likely each action.

For example, a player can be taken and all of the nodes that are connected to the player may be taken as specific facts about the player. As depicted in FIG. 5, specific facts related to PlayerX can be discovered through traversal of edges connected to PlayerX. PlayerX node is connected to Time Segment 00:00 to 00:005 that is also connected to the Ball node. This indicates that PlayerX had the ball over this time interval, and may be used to discover all of the interactions that occurred with the ball. Continuing with this traversal, the edges may be followed from the player name to see what were all the player actions, where PlayerX interacted with the ball, and so on, and traverse a time series on a planar graph to determine various information about what PlayerX did over a time series that has been correlated into the graph 500.

This type of metadata may be used as an input to a machine learning algorithm and the machine learning model may be trained, starting with a linear regression model, and reach convergence through a semi-supervised approach using pairs of parameterized inputs and expected outputs based on the explicit graph traversal algorithm. Once confidence is reached, the model may be relied upon to produce the same input. Pairs of parameterized inputs and expected outputs may include context or domain-specific questions that may be expected, for example, in the realm of soccer. An example input would be the question, "Did PlayerX score a goal with a header?" and the corresponding output may simply be "Yes" or may be a more detailed answer, such as when the goal was scored, what manner was the goal scored (e.g., was the goal scored off a corner kick, set play, or dynamically on the field, was the goal assisted), and so on.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates a diagram 100 in which a set of NLP engines are utilized to process a user interaction, in accordance with one or more example embodiments of the present disclosure. Users may interact with a smart assistant or intelligent device for more engaging and enriched viewing experience of live programming, such as sports events, and others.

In various embodiments, user 102 refers to a viewer or other entity that may interact with a smart assistant, smart television, or other intelligent device. Rather than using human interface devices such as a mouse, keyboard, or touch screen to interact with the device, user 102 may use speech 104 to provide commands to interact with the device. The device may be configured to receive speech 104 inputs via a microphone, array of microphones, or other suitable audio capture component. The device, may use a wakeword detection component to process speech 104 to determine if a keyword (e.g., a wakeword) is detected in the audio data. In at least one embodiment, following detection of a wakeword, and processes the speech 104 in the manner depicted in FIG. 1.

In at least one embodiment, a device or system receives speech 104 as audio input and performs a step to identify 106 one or more models to answer the user's question. More generally, user 102 may interact with the device in any suitable manner, which may not be constrained to only asking questions, but also issuing commands or requests to the device. In general, any suitable speech may be processed, including but not limited to questions.

The device may perform semantic processing on speech 104 to identify a set of features or feature words. For example, in speech 104, user 102 may ask the question "Which countries have won the World Cup?" and semantic processing may be used to identify various words that are important to processing the user's request, such as "World Cup" "countries" and "won" which are all relevant to the determination of how to answer the user's question. One or more NLP frameworks 108A, 108B, etc. may be identified to answer the user's question, as described in greater detail below.

Trained models such as trained models 112A, 112B, 112C, etc. may refer to models that are used to generate metadata. Metadata may be generated independently of the user speech 104 and may form the foundation of the facts and knowledge that are used to process user requests and provide information responsive to the user's questions. Metadata generated by trained models may be normalized and run against a common NLP engine. For example, a set of trained models 112A, 112B, 112C, etc. are run against a common model NLP engine 110 that may be segmented by sport, segmented by topic, segmented by feature word, or any other suitable manner of segmentation. Segmentation may be based on different verbs and characteristics that the NLP engine extracts when it is trained on the models.

Different sets of models may be provided as inputs to different NLP engines. NLP engines may be trained to handle different feature words or phrases. For example, NLP engine 110 of first framework 108A may be trained to handle "World Cup" and may be segmented by sport—namely, soccer. As a second example, a second NLP engine of second framework 108B may be trained to handle the "countries" feature. These are illustrative in nature, and greater for fewer numbers of frameworks with greater or fewer numbers of trained models per model NLP engine are contemplated within the scope of this disclosure. It is noted that this NLP engine may be segmented based on sport—for example, a feature such as "teams" may generally refer to a broad set of teams but may be constrained based on segmentation. Model NLP engines may be segmented based on topic, such that "team" may refer to teams of a specific sport or topic (e.g., all soccer teams, all soccer teams within a specific league, and so on) rather than being so broad as to cover all teams across all sports. The topic-specific nature of the frameworks may be used as a refinement mechanism that enables greater prediction accuracy and results to be generated in response to user questions and commands.

Returning to FIG. 1, speech 104 may be analyzed using a speech recognition processor to identify a set of features or constituent parts to speech 104. Feature words may be mapped to specific frameworks that are trained on such topical information. First framework 108A may be trained to handle "World Cup" as a feature word, second framework 108B may be trained to handle "countries' as a second feature word, and so on. First framework 108A may be trained based on "World Cup" and can output a first set of data that is associated with the World Cup and this first set of data may be related to other sets of data from other frameworks. For example, second framework 108B may be used to obtain a second set of data regarding country information regarding various soccer countries. The intersection of these two sets may be used to determine countries that have participated in the World Cup. Further processing (e.g., involving a third feature relating to teams that have "won" the event) may be used to identify the set of countries that have won the World Cup.

In various embodiments, the system analyzes the provided phrase from speech 104 and maps it to sub-phrases or features within each NLP framework, and each NLP framework may be able to map the sub-phrase or feature to all of the sets of available metadata associated to the specific sub-phrase or feature. Sources of metadata may include, live video streams, which may be processed in real-time or in a post-hoc manner using computer vision machine learning or artificial intelligence models. Metadata may be generated by external sources—for example, on-demand video streams provided by a third-party may also be annotated by the third party. Metadata from third parties may be encoded in a different format than a format that is expected by an NLP engine and, in such cases, may be reformatted or normalized so that it can be consumed by the NLP engine. In some embodiments, the time series dimension of metadata and facts is compressed so that temporal information is correlated into a metadata graph and may be traversed to determine the temporal sequence of events and related facts. In various embodiments, a dictionary mapping is used to associate sub-strings or sub-phrases to NLP engines. In some embodiments, a heuristic (e.g., brute force approach) may be used to identify appropriate NLP engines from speech 104. It should be noted that in some embodiments, additional contextual information may be used to further refine phrases or feature words found in speech 104.

Model NLP engine 110 may use language syntactical processing to determine the number of sub-questions, sub-topics, features, etc. in a particular audio input (e.g., speech 104) or if the questions relate to a quantitative operation or qualitative comparison. In some embodiments, NLP engine 110 analyzes audio input and bifurcates the input audio using speech analysis algorithms to into a set of sentence fragments and returns the results for analysis so that the fragments may be analyzed in isolation or in related combinations. In some embodiments, training of NLP model may involve configuration and/or involvement by data engineers to tune or update the model for relevancy and accuracy. In some embodiments, each system of models for an event are viewed in tandem or in combination for a particular sport or league, resulting in a macro-system which can answer any generalized questions regarding a specific topic at various levels of generality or specificity.

Figure 2:
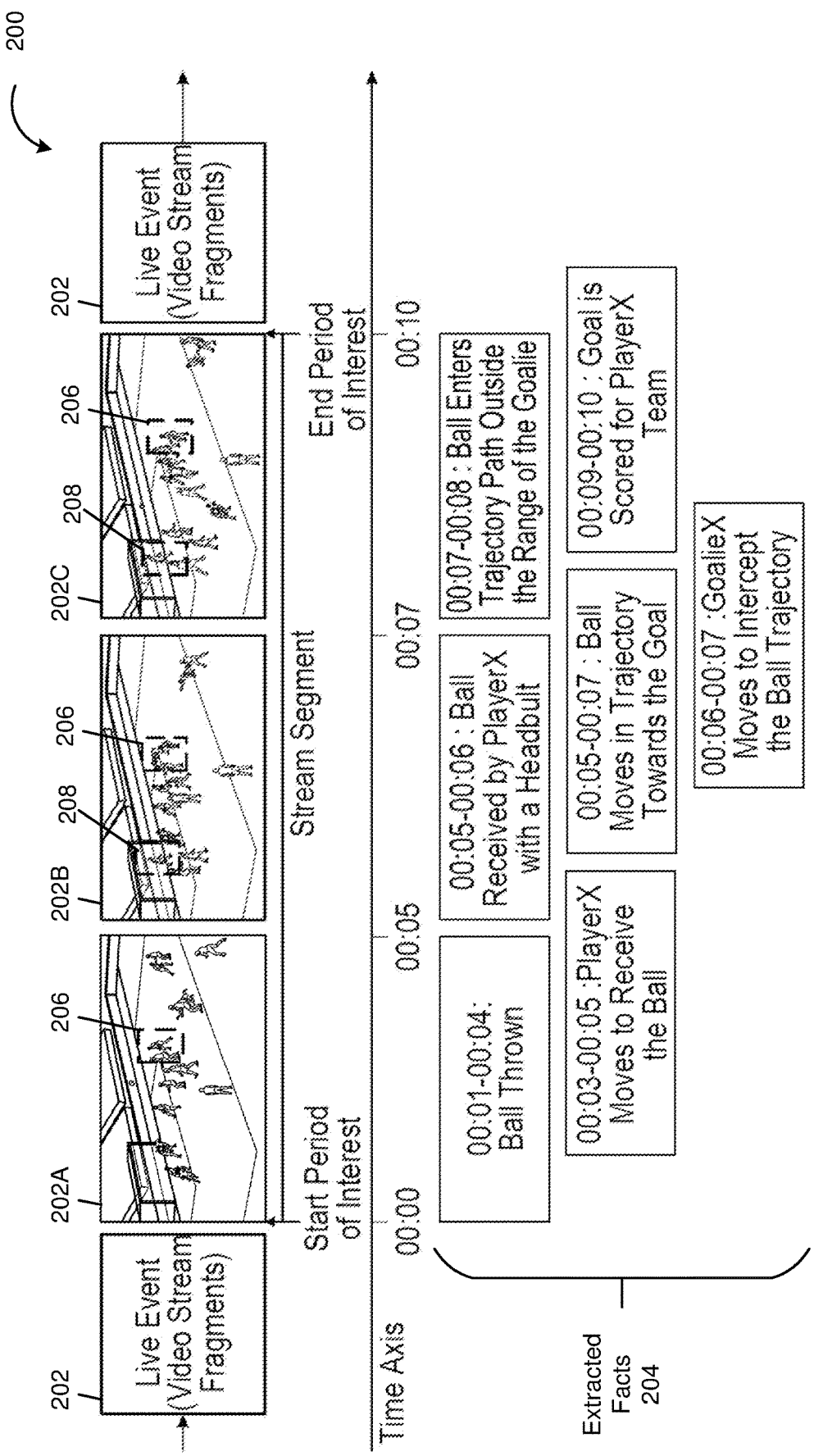
FIG. 2 illustrates a diagram in which facts and metadata are extracted from a live event video stream, in accordance with one or more example embodiments of the present disclosure.

FIG. 2 illustrates a diagram 200 in which facts and metadata are extracted from a live event video stream, in accordance with one or more example embodiments of the present disclosure.

FIG. 2 depicts, in at least one embodiment, a multimedia stream 202 of a live event. Multimedia stream 202 may be encoded in any suitable digital format, such as H.264, MPEG-4, MPEG-2, and/or other formats. FIG. further depicts a 10-second period of interest within the multimedia stream 202. The period of interesting may be a highlight of a player unexpectedly scoring during a sporting event. The period of interest may be identified dynamically or post hoc through analysis of the multimedia stream by a computer-based machine learning model based on facts 204 extracted from the multimedia stream. Frames 202A-C may refer to specific frames of multimedia segment 202 from the period of interest over which a first player 206 runs towards a ball in first frame 202A, heads the ball in the second frame 202B, and watches the header on goal in third frame 202C and a second player 208 (e.g., goalkeeper) tracks the ball and unsuccessfully attempts to block the header from scoring.

In at least one embodiment, for a period of interest, when evaluated as a time series of the whole, certain facts 204 emerge about the occurrence. Facts 204 may be of textual human readable or other image, binary or otherwise non-human readable representation. For example, of a group of hashes for image features which define a particular player tracked by computer vision system or the location where the game is played. In various embodiments, these facts and other information gleaned from the period of interest may be fed into a network generation system from any source. Facts 204 extracted from a video stream may provide the basis for more granular metadata that may be generated, for example, in accordance with techniques described in connection with FIG. 3.

Extracted facts 204 may comprise event metadata and temporal information. For example, a first extracted fact 204A, as depicted in FIG. 2 may depict event information indicating that a ball was thrown in and time series information indicating that the event occurred from 00:01 to 00:04 in the video stream fragment of interest. Continuing, an overlapping second fact 204B may indicate that PlayerX was moving to receive the ball (second event metadata) at a time window from 00:03 to 00:05. In some embodiments, a metadata graph encodes relationships between various facts extracted from a video segment. For example, a metadata graph may include an edge connecting first fact 204A and second fact 204B indicating that the two events are related—for example, the relationship may represent that first event 204A relates to the ball being thrown in and second event 204B relates to PlayerX moving, from 00:03 to 00:05, to receive the ball that is being thrown in from 00:01 to 00:04.

Figure 3:
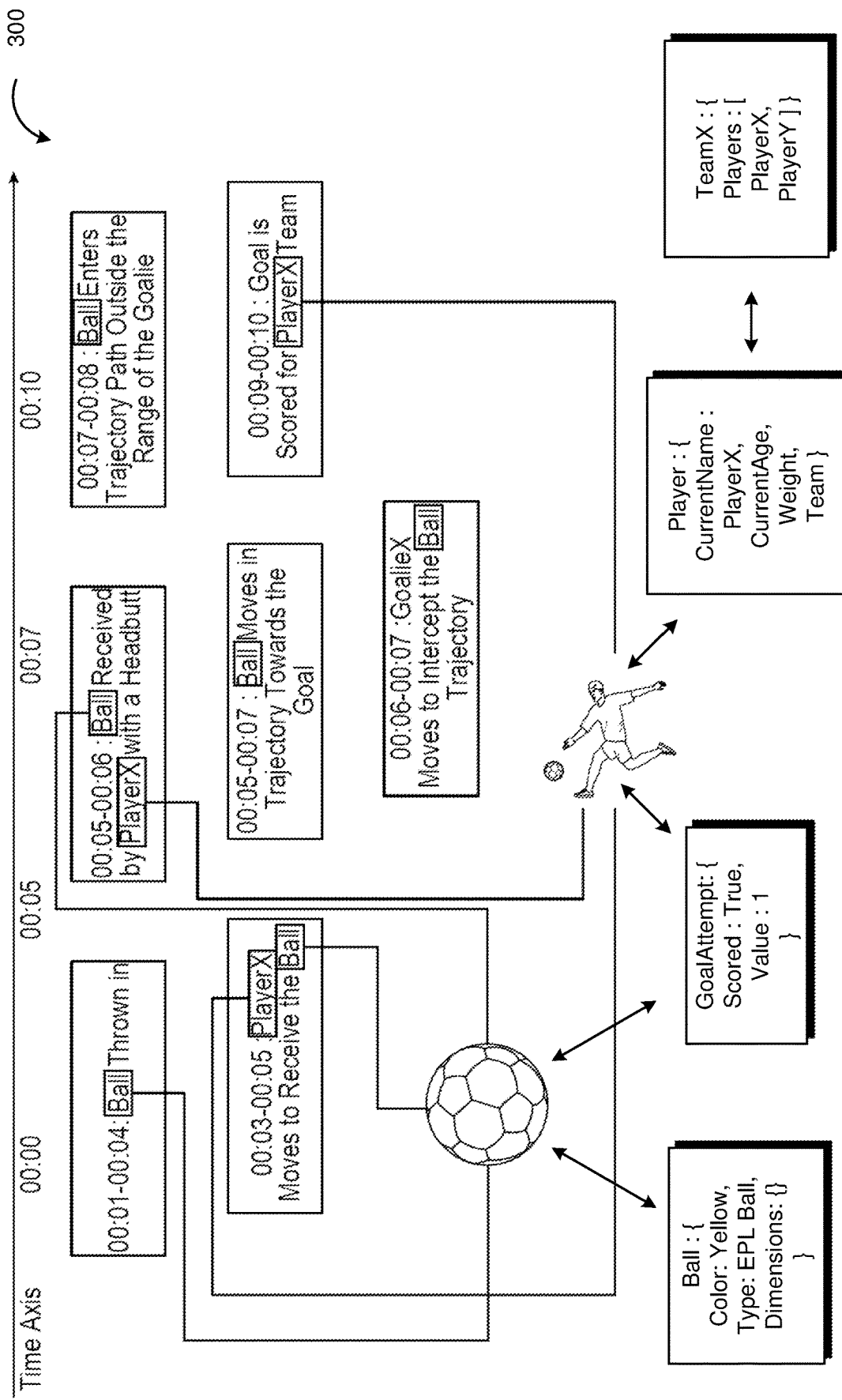
FIG. 3 illustrates a diagram in which metadata is extracted from a video stream, in accordance with one or more example embodiments of the present disclosure.

FIG. 3 illustrates a diagram 300 in which metadata is extracted from a video stream, in accordance with one or more example embodiments of the present disclosure. FIG. 3 illustrates metadata that may be extracted from a raw video stream. FIG. 3 illustrates keyword associations and annotations being generated for a time period of interest. This may be described in connection with FIG. 2, wherein factual information is extracted from a raw video stream. As shown in FIG. 3, extracted facts 302 may refer to facts that were extracted from a video segment of interest, for example, as discussed in connection with FIG. 2. Factual information extracted may be encoded as discrete units of extracted facts. A first fact 302A may indicate that a ball is being thrown in from 00:01 to 00:04; a second fact 302B may indicate that PlayerX is moving to receive the ball from 00:03 to 00:05; a third fact 302C may indicate that PlayerX headbutts the ball from 00:05 to 00:06, and so on. Factual information may be represented as a time series of event information that can be partially or even fully overlapping (e.g., as in the case where two players are simultaneously moving towards the ball). Each time series may encode information about various objects and actions over the time series. In various embodiments, factual information extracted from a time series is analyzed for keywords and tagged to associate those specific time series to the respective keywords. Keywords may be associated with players, teams, actions, events, etc. As different time series are tagged with various keywords, a database of metadata may be constructed to all of the different occurrences where a particular keyword may be relevant. For example, a viewer may ask, "Who just scored the ball?" after the highlighted time period, perhaps because the goal was scored unexpectedly or quickly so that the viewer was caught off guard. Keywords relevant to the user's question may include "who" and "scored," The "scored" keyword may be further modified by "just," which may also be considered a keyword or a sub-keyword in some cases as it modifies the "scored" keyword and may be used in the determination of the semantic meaning of the question being presented. Accordingly, if a player scored at a specific point in time each point when there was contact with the ball could be represented within this time series and highlighted by the ball, as the semantic processing may indicate that a ball, based on context, is needed to be "scored." Accordingly, the factual information may be parsed to identify each time series that includes "ball" as one step of semantic processing. Semantic processing may, additionally, identify all time series that include players in the time period of interest. The "who" keyword may be used to determine that players are contextually relevant and to filter on all of the time series segments that include a player, such as PlayerX or GoalieX. Finally, the "scored" keyword may be used to filter on events related to a goal being scored, shots on a goal, and other keywords upon which to filter on, which may be determined based on their semantic similarity to the keyword uttered by the user.

These intersections of time series identified as being associated with different keywords may be used to identify metadata 304A-D or other information that may be used in connection with a metadata graph to formulate factual questions and/or answers. The time series information may link the ball metadata 304A as being moved through the air at 00:05-00:06 and having been received by PlayerX as a headbutt. This time series event may be associated with both the ball and player keywords. Likewise, player metadata 304C may be associated with extracted facts 302, where the player is moving to receive the ball at 00:03 to 00:05, that PlayerX received the ball with a headbutt at 00:05 to 00:06 and then that Player X scored a goal at 00:09 to 00:10. The factual information may furthermore indicate that at 00:05-00:07 the ball moved in trajectory towards the goal, which is also related to the ball keyword, and the factual information may further indicate that the ball went into the net and is scored at 00:09-00:10, which may provide the event information encoded in the goal attempt metadata 304B. In some embodiments, the factual information does not indicate who scored, but rather, this information is determined through metadata analysis and mapping. In some cases, the factual information may merely state that a goal was scored based on a depiction of a ball going into the net, and the determination of who is scored is based on a keyword analysis that determines PlayerX was the last person to touch the ball and therefore should be credited with the goal. FIG. 3 also illustrates team metadata 304D, which may be used to determine additional information, such as information relating to which team scored (e.g., to update a scorecard) and may be inferred based on the association between PlayerX who scored the goal and TeamX which includes PlayerX as a rostered player.

FIG. 3 furthermore illustrates how semantic processing may be used to filter out irrelevant factual information. As depicted in FIG. 3, there are additional time series events at 00:06-00:07 where GoalieX moved to intercept the ball and at 00:07-00:08, the ball entered a trajectory outside the range of the goalie. Semantic processing of the question relating to "Who just scored the ball" may be used to determine that the "ball" keyword has local relevance (e.g., in isolation to the "ball" keyword) but may be filtered out due to the information included in these events not being relevant to who scored. Accordingly, filtering based on the intersection of keywords may sometimes include a time series and other times exclude a time series. For example, if the user had instead asked, "Did the keeper get a hand on the ball?" the phrase may be parsed and identify that the goalkeeper is the relevant actor and that the time series event from 00:07-00:08 intersects with whether the keeper was able to get a hand on the ball.

Figure 4:
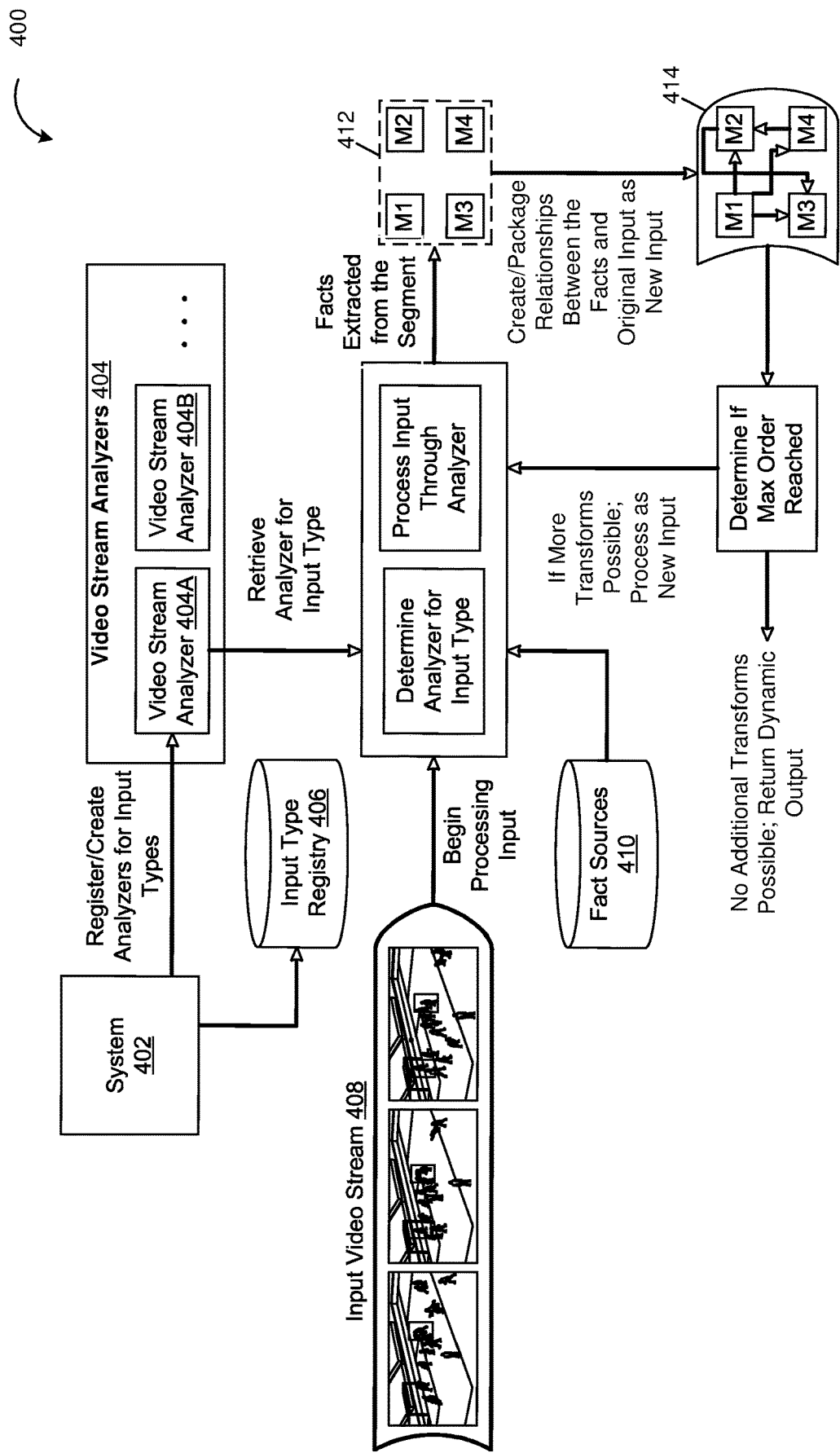
FIG. 4 illustrates a computing environment in which various techniques described in this disclosure may be practiced, in accordance with one or more example embodiments of the present disclosure.
Figure 5:
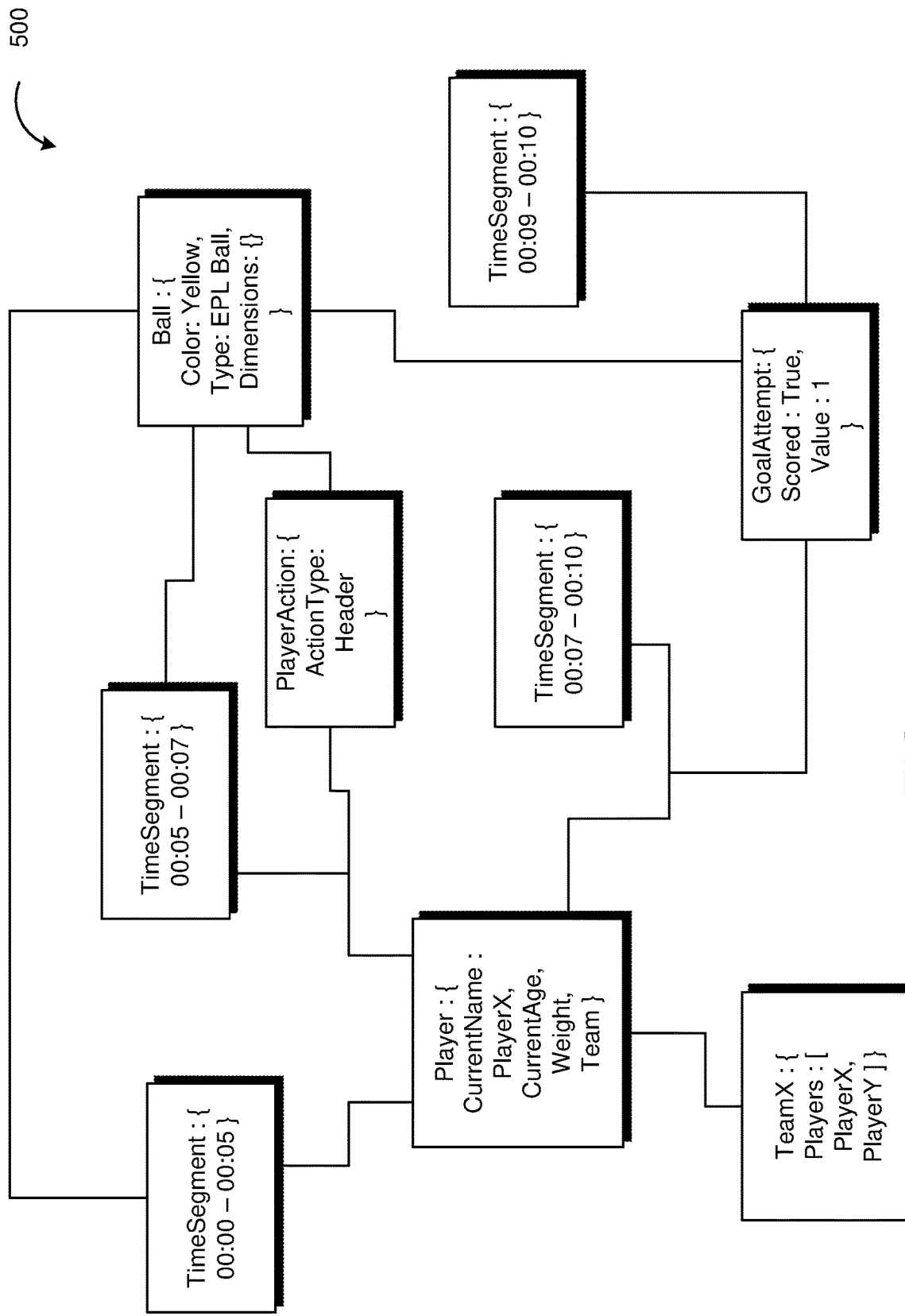
FIG. 5 illustrates a computing environment in which various techniques described in this disclosure may be practiced, in accordance with one or more example embodiments of the present disclosure.

FIG. 4 illustrates a computing environment 400 in which various techniques described in this disclosure may be practiced, in accordance with one or more example embodiments of the present disclosure.

In various embodiments, there are two different inputs—the top line where the analyzers are registered and/or created for input types. Video stream analyzers 404 may be adapters that can be used to take different models from different metadata sources from other places and adapt them into the time series format that can be processed by downstream components. In some embodiments, a third party (e.g., another entity) has already parsed video stream data and has generated and provided factual information that is in a different format incompatible with the time series format that is used by the downstream models. For example, if a third-party generates annotations in a first incompatible format, a first video stream analyzer (e.g., 404A) may be used to generate facts that are in the format that can be consumed by downstream components and annotations in a second incompatible format may be adapted to a suitable format for downstream consumption using a second video stream analyzer 404B. System 402 may provide video stream analyzers 404 that can take different metadata sources encoded in different formats (e.g., generated for other uses) and confirm them to the time series format that can be consumed by downstream components. System 402 may programmatically generate the video stream analyzers. In some embodiments, system 402 is a computer system that may be operated or otherwise controlled by a user. Different types of metadata encoded in different formats may be associated with different video stream analyzers that are operable to generate a common metadata format that conforms with the time series format that is used by downstream components.

Input type registry 406 may refer to a registry, repository, or other information data store. For example, input type registry 406 may be implemented as a relational database, memory mapped file, or other suitable types of data stores. When a new type of video stream analyzer is on-boarded or added to the environment 400, a corresponding entry may be added to input type register 406 that provides a mapping between the newly added video stream analyzer to identify the video stream analyzer. In some embodiments, input type registry 406 is used to map input types to video stream analyzers so that an appropriate analyzer may be selected for processing the input. For example, environment 400 may include various video stream analyzers for various sports, such as soccer, basketball, and baseball, and input type registry 406 may be used to appropriately select the corresponding type of video stream analyzer when a soccer video stream, basketball video stream, or baseball video stream is provided for input processing. Input type registry 406 is used to determine a mapping that identifies which analyzer(s) should be used for a specific input and the algorithms) to run against.

Input video stream 408 may refer to a multimedia stream or portion thereof. An input stream may comprise segments or clips of content, which may be analyzed in whole or in part by video stream analyzers. Input video stream 408 may be a live broadcast, on-demand content, etc.

In at least one embodiment, a component will determine analyzer for input type 416. Input type registry 406 may be used to identify which video stream analyzer(s) of a plurality of available video stream analyzers 404 should be run for the input video stream 408. For example, the begin processing input step may comprise receiving input video stream 408, and select, based on the input type registry 406, a video stream analyzer. For example, input processing 418 may comprise determining that the video stream is related to soccer, performing a lookup using input type registry 406 to identify a video stream analyzer that provides soccer information, and then selecting said video stream analyzer. In some embodiments, a classification model may be used to analyze input video stream 408 in a pre-processing step to determine a corresponding input type for the input video stream. The classification model may, for example, be implemented at least in part as a K-nearest neighbors (K-NN) classifier. In some embodiments, input video stream 408 may be provided to video stream analyzers 404 for classification. For example, a first video stream analyzer 404A trained on soccer videos may be able to positively identify video input stream 408 as being related to soccer and extract features and metadata from the input video stream, whereas a second video stream analyzer 404B trained for basketball may fail to identify any features or metadata, or may have low confidence in such determinations. In some embodiments, the determination or absence of facts and/or metadata from a video input stream by a video stream analyzer may be used to aid in the determining of an analyzer for an input.

Fact sources 410 may refer to a data store of additional factual information provided out-of-band from input video stream 408. Whereas input video stream 408 may provide visual and/or audio information regarding a specific event, fact sources 410 may serve to provide additional historical facts that may be used in the generation and/or determination of metadata. For example, input video stream 408 may provide a live video stream with a highlighted segment of a sports event where a PlayerX receives a corner kick from PlayerY and scores. Fact sources 410 may provide background information about previous corner kicks, previous games, and additional information relating to PlayerX and PlayerY.

For example, fact sources 410 can provide the background information needed to generate trivia questions that rely on historical facts, such as the following trivia question: "PlayerX has scored goals assisted by eight different players ($2^{nd}$ in league)—who has scored goals assisted by the most number of different players?" Such a trivia question may rely on different types of contextual information. For example, processing such a trivia question may rely on contextual information from the input video stream, such as time series metadata for a segment of the input video stream where PlayerX scored a goal and was assisted by PlayerY. As a second example, processing such a trivia question may rely on contextual information historical facts relating to the specific actors depicted in the input video stream, such as information regarding previous goals scored by PlayerX over the entire season. As a third example, processing such a trivia question may rely on contextual information historical facts relating to historical facts based on context, such as determining whether a different player has been assisted by a greater number of different players. Various combinations of contextual information may be utilized for processing of trivia questions.

Combinations of different types and sources of contextual information may be used to generate a trivia question related to a highlight, such as PlayerX scoring a goal. Trivia questions are not necessarily topically focused on the highlight. For example, in the case where PlayerX scored a goal, a trivia question may relate to identifying a different player who has been assisted by a greater number of players and may be information not readily available solely from input video stream 408. Such a trivia question may require additional knowledge or information than from what is immediately available from input video stream 408, making such trivia questions and their answers more pleasing to a viewer that is a sports enthusiast who may be able to answer the question correctly whereas a less engaged viewer may be unable to answer the question due to lack of knowledge or engagement. In at least some embodiments, fact sources 410 are encoded in the time series format utilized by downstream components. In some embodiments, fact sources 410 are external data sources accessed by a service provider of environment 400 via a communications network such as the Internet.

Video stream analyzers 404 may be utilized to determine facts and metadata 412 from input video stream 408 and in conjunction with fact sources 410. For example, and according to various embodiments, fact sources 410 may include historical factual information on corner kicks and there may be a corner kick video stream analyzer trained to process video content for corner kicks and generate facts and metadata from video content of this specific type. Accordingly, when a corner kick is detected in input video stream 408, metadata from factual sources as well as metadata determined by the corner kick video stream analyzer may be overlapped and used to expose fats as to who scored on corner kicks, who performed assists, when those kicks occurred, who was the goalkeeper was, and so on. Associations may be made between various metadata points in a semantically coherent manner and combined to identify facts and intersections thereof that are meaningful and engaging to viewers.

Upon having obtained a segment of the input video stream, factual sources may be queried and one or more metadata outputs determined from an appropriate video input analyzer as determined based on the input type. The outputs from the analyzer and/or fact sources may be combined to form the corpus of facts that are being extracted from the segment. For example, a video stream analyzer may be used to extract various contemporaneous facts from input video stream 408 such as the fact that PlayerX scored a goal on a corner kick in a highlight segment, and fact sources 410 may be used to determine that the goal was the eighth goal scored by PlayerX on a corner kick, and furthermore, may relate to other facts, such as the fact that PlayerX has the second most goals scored off corner kicks in the league this seasons.

Facts and metadata 412 may be extracted from the input video stream 408 by use of a suitable video stream analyzer (e.g., selected from a plurality of video stream analyzers 404 based on input type registry 406) and background fact provided by fact sources 410. Facts and metadata 412 may be formatted with time series information, for example, as described in connection with FIG. 1. Facts and metadata 412 depicted as M1, M2, M3, and M4 are illustrative and serve to show how discrete facts and metadata may be determined thus far, but without additional context around the nature of how they are interrelated.

Relationships between facts and original input may be created and packaged as new input in a recursive manner. When an initial set of facts are generated, they are used in a feedforward recursive system with a max recursion or max order, wherein the output generated from a first iteration is used as the input until a max order has been reached 420. In some cases, the recursive system terminates when there is no more complexity that can be extracted from the system. In various embodiments, the recursion terminates when no additional transforms are possible. Relationships may be represented as directed edges that connect one piece of metadata with another by time segment. For example, M1 may be related to M2, M3, and M4 based on the outbound arrows between M1 and each of M2, M3, and M4.

Once this information is fed into the system, a level of abstraction attempts to refine the input to its most granular information by running it through an analyzer that can be loaded with any other model or algorithm to produce a set of raw images or notions. These fragments of information can exist outside of the time dimension of the segment or may intersect with the time dimension non-linearly. Some of these metadata may make sense when applied to their factual context. When consuming these fragments, any N variety of analyzers can be registered (e.g., by a human user with an expected input and output) and, after multiple processing iterations, generate a dynamic metadata graph 414 that expresses a rich relationship between the data. Individual metadata for facts may be semantically linked to other metadata or facts by using analyzers to determine edges between two or more metadata or facts. Metadata or facts may be interrelated at specific time segments. The metadata graph 414 may be implemented in accordance with techniques described in connection with FIGS. 5, 7, and elsewhere in this disclosure.

FIG. 5 illustrates a computing environment 500 in which various techniques described in this disclosure may be practiced, in accordance with one or more example embodiments of the present disclosure.

In various embodiments, FIG. 5 illustrates a graph representation with key facts and annotations of how the facts and metadata may be interrelated to each other. Key facts and metadata depicted in FIG. 5 include information regarding various properties or aspects of a segment of multimedia. As an illustrative example, FIG. 5 may depict facts and metadata extracted for a highlighted segment where PlayerX scored on a header, for example, as described in connection with examples discussed in connection with FIG. 2. FIG. 5 may depict various nodes of the graph representation that correspond to key facts and metadata relating to the highlight. These core facts may include information regarding PlayerX, goal attempts, and more. In some embodiment, information encoded in a node, such as a player's weight or current age, may be information that is obtained from a historical fact source, such as those discussed in connection with FIG. 4. Lines between them may be viewed as annotations on the edge showing how the interrelated data can be structure. Conceptually, a video may, for each different point in the video, have associated annotations for the actions that are unfolding in the video at each time segment. These common annotations may be aggregated and taken to create a single model that represents all of the different multiple occurrences of actions and events happening in the multimedia stream. In at least one embodiment, these events are correlated temporally into a graph representation that removes the time dimensionality by creating additional temporal nodes to reflect the temporal dimension. Time segments may be encoded as temporal nodes of the graph wherein the edges to and from temporal nodes may be traversed to describe the sequence of events that occurred as a time series. Taken together, the nodes can be used to focus on the actions of a specific player over a segment of time, focus on all of the interactions with the ball that occurred over the video clip, and so on.

For example, a player can be taken and all of the nodes that are connected to the player may be taken as specific facts about the player. As depicted in FIG. 5, specific facts related to PlayerX can be discovered through traversal of edges connected to PlayerX. PlayerX node 502 is connected to a time series node 504 via edge 506. Time series node 504 corresponds to time segment 00:00 to 00:05 that is also connected to the Ball node 506. This indicates that PlayerX had an interaction relating to the ball over this time interval, and may be used to discover all of the interactions that occurred with the ball. Continuing with this traversal, the edges may be followed from the player name to see what were all the player actions, where PlayerX interacted with the ball, and so on, and traverse a time series on a planar graph to determine various information about what PlayerX did over a time series that has been correlated into the graph 500.

This type of metadata may be used as an input to a machine learning algorithm and the machine learning model may be trained, starting with a linear regression model, and reach convergence through a semi-supervised approach using pairs of parameterized inputs and expected outputs based on the explicit graph traversal algorithm. Once confidence is reached, the model may be relied upon to produce the same input. Pairs of parameterized inputs and expected outputs may include context or domain-specific questions that may be expected, for example, in the realm of soccer. An example input would be the question "Did PlayerX score a goal with a header?" and the corresponding output may simply be "Yes" or may be a more detailed answer, such as when the goal was scored, what manner was was goal scored (e.g., was the goal scored off a corner kick, set play, or dynamically on the field, was the goal assisted), and so on.

Figure 6:
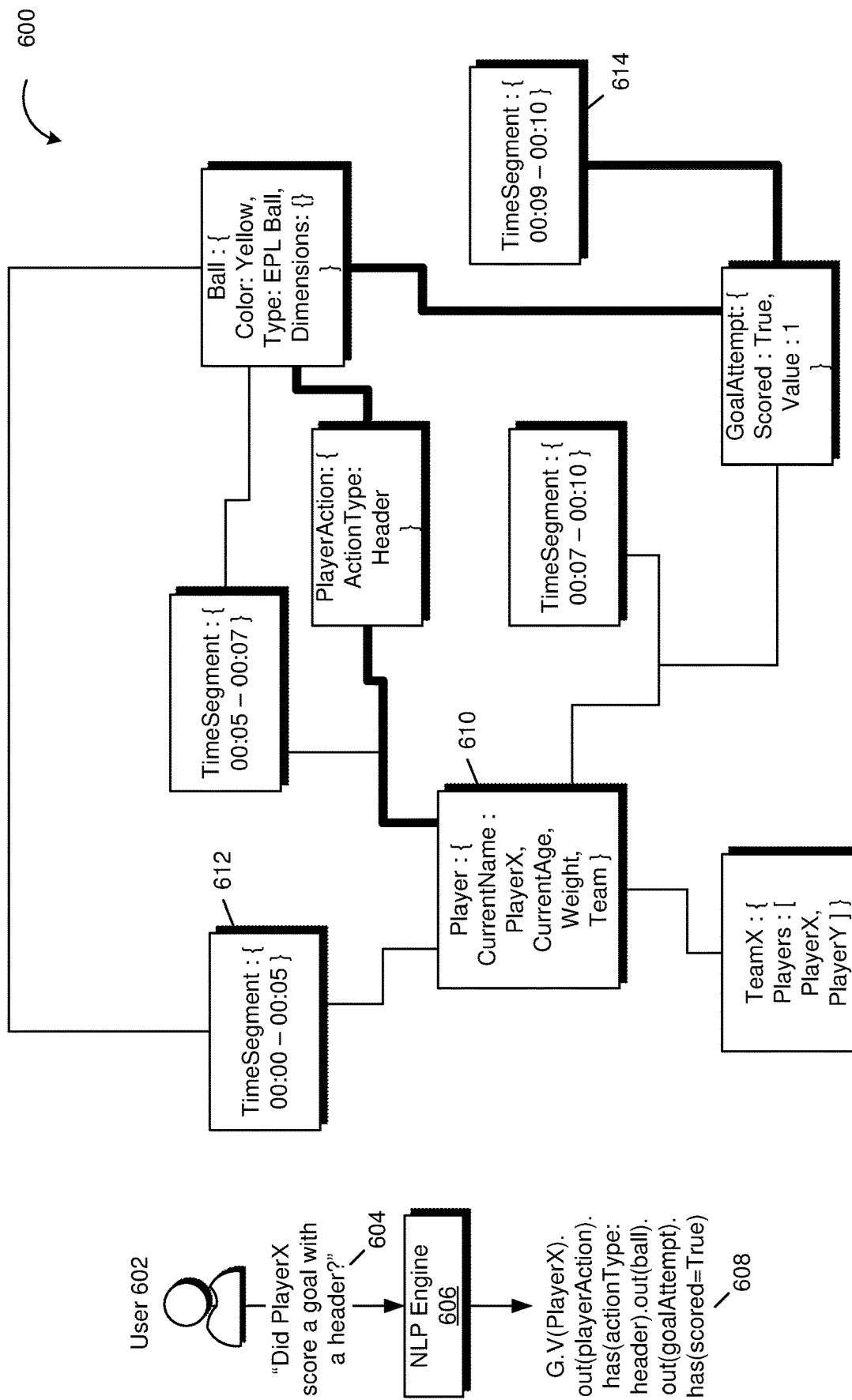
FIG. 6 illustrates traversal of a metadata graph to process a user question, according to at least one embodiment.

FIG. 6 illustrates how a graph 600 may be traversed to process a user question, according to at least one embodiment.

This type of metadata may be used as an input to a machine learning algorithm and the machine learning model may be trained, starting with a linear regression model, and reach convergence through a semi-supervised approach using pairs of parameterized inputs and expected outputs based on the explicit graph traversal algorithm. Once confidence is reached, the model may be relied upon to produce the same input. Pairs of parameterized inputs and expected outputs may include context or domain-specific questions that may be expected, for example, in the realm of soccer. An example input would be the question "Did PlayerX score a goal with a header?" and the corresponding output may simply be "Yes" or may be a more detailed answer, such as when the goal was scored, what manner was the goal scored (e.g., was the goal scored off a corner kick, set play, or dynamically on the field, was the goal assisted), and so on.

In various embodiments, the machine learning model is trained against a graph query such as a gremlin query. Natural language processing may be used to translate a phrase (e.g., spoken question) into a gremlin query that is used for graph traversal. As depicted in FIG. 6, a user 602 may ask a soccer-related question (e.g., speech 604) such as "Did PlayerX score a goal with a header?" An NLP engine 606 may be used to parse the question. NLP engine 606 may be implemented using any suitable speech and/or user recognition system that extracts semantic meaning from speech audio. NLP engine 606 may be implemented as a speech recognition model that is trained using audio data from user 602. NLP engine 606 may be in accordance with one or more NLP engines described in connection with FIG. 1. In some embodiments, NLP engine is trained to parse sports-specific speech, such as soccer-related questions and trivia. An input video stream may be processed by an appropriate analyzer and graph 600 may be generated with all relevant facts and metadata determined to be relevant. In at least one embodiment, NLP engine determines the constituent parts of speech 604 and generates a corresponding graph or Gremlin query. For example, the question "Did PlayerX score a goal with a header?" from speech 604 may have various constituent parts, such as an actor PlayerX, action type (header), event (goal attempt), and additional event-related information (scored being true). The semantic meaning of the speech 604 may be parsed by NLP engine 606 to generate query 608.

Query 608 may be used to traverse graph 600. In at least one embodiment, the query 608 specifies a starting point for the query—in this case, the starting point is node 601, corresponding to PlayerX, which was determined through NLP processing that the subject of the speech 604 was focused on PlayerX. Other questions may have other starting points or other query constructions. For example, if user 602 asked, "How many goals have been scored this quarter?" the question may start with a different node 612 corresponding to the start of the quarter, and traverse through the entirety of the query to determine a count of the number of goals that were scored in the quarter. Returning to FIG. 6, the PlayerX's node 610 may be the starting point. The starting point may be traversed according to the query 608 to determine how to answer the question. For example, query 608 starts at node 610 for PlayerX and attempts to find a traversal of graph 600 out of PlayerX's node to another node that has the "header" action type. The player action "header" being connected to the Ball node may indicate an interaction between the header player action and the ball. This may indicate that the player actually made contact with the ball. Additionally, the ball has an outbound node for goal attempt and is true, indicating that the goal was scored and that query 608 should be answered in the affirmative.

Additional information, such as the time segment information, may be gleaned from the graph traversal, so that the answer to speech 604 may include such additional information and be answered, for example, with additional contextual information. For example, an artificial intelligence or smart assistant may process "Did PlayerX score a goal with a header?" using NLP engine 606 to generate query 608 and traverse graph 600 to determine the answer is in the affirmative. Additional outward nodes from the last node traversed (e.g., Goal Attempt node), such as node 614, may be returned to provide additional contextual information. For example, node 614 provides information as to when the goal was scored. Accordingly, the answer to "Did PlayerX score a goal with a header?" as asked by user 602, may be answered more completely than the question asked. For example, "Yes" would be a full answer to the asked question, but by using additional information from outbound nodes, the smart assistant may generate a more contextually relevant answer "Yes, PlayerX scored a header goal from 00:09 to 00:10. Would you like to see a highlight of this goal?" and provide the user with an opportunity to further engage with the topic.

It should be noted that in some embodiments, there may be multiple ways to traverse the graph to arrive at the node. For example, graph 600 also encodes that PlayerX had the ball from 00:05 to 00:07 via a time segment node and that this time segment node is also connected to the Ball node, which means that PlayerX interacted with the ball from 00:05 to 00:007. Further traversing from this time segment node would indicate that PlayerX has not interacted with the ball via the action type "header," which would be an alternative way to traverse graph 600 to answer the user's question.

Figure 7:
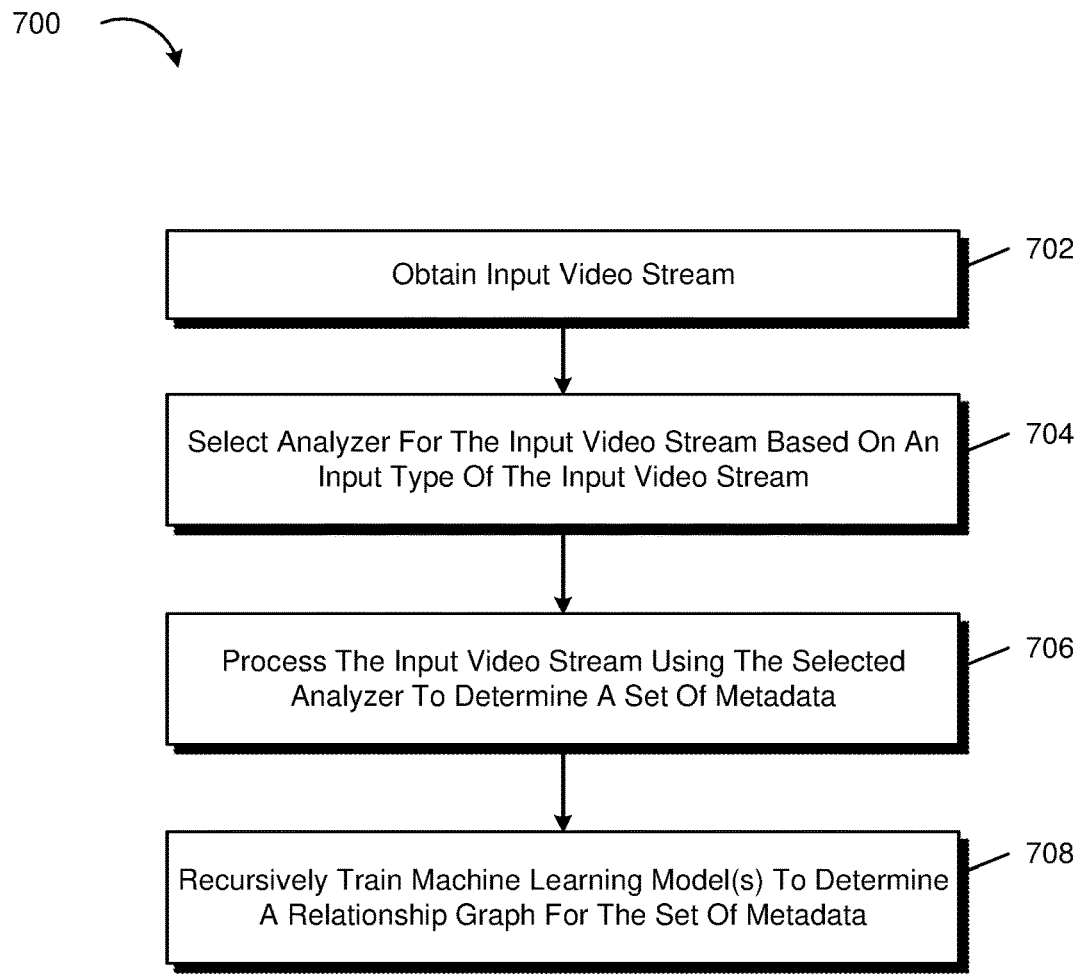
FIG. 7 shows an illustrative example of a process for processing video streams to determine relationships between metadata and facts, in accordance with one or more example embodiments of the present disclosure.

FIG. 7 shows an illustrative example of a process 700 for processing video streams to determine relationships between metadata and facts, in accordance with one or more example embodiments of the present disclosure. In at least one embodiment, some or all of the process 700 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 700 may be implemented in the context of various systems and methods described elsewhere in this disclosure, such as those discussed in connection with FIGS. 1, 4, and 9. In at least one embodiment, process 700 or a portion thereof is implemented by a computing resource service provider.

In at least one embodiment process 700 comprises a step to obtain 702 an input video stream. Input video stream may refer to a multimedia stream or portion thereof. An input stream may comprise segments or clips of content, which may be analyzed in whole or in part by video stream analyzers. Input video stream may be a live broadcast, on-demand content, etc.

In at least one embodiment process 700 comprises a step to select 704 analyzer for the input video stream based on an input type of the input video stream. In at least one embodiment, the system performing process 700 determines an input type of the input video stream and selects an analyzer based on the input type. Input type registry may be used to identify which video stream analyzer(s) of a plurality of available video stream analyzers should be run for the input video stream. For example, a processing input step may comprise receiving input video stream, and selecting, based on the input type registry, a video stream analyzer. For example, input processing may comprise determining that the video stream is related to soccer, performing a lookup using input type registry to identify a video stream analyzer that provides soccer information, and then selecting said video stream analyzer. In some embodiments, a classification model may be used to analyze input video stream in a pre-processing step to determine a corresponding input type for the input video stream. The classification model may, for example, be implemented at least in part as a K-nearest neighbors (K-NN) classifier. In some embodiments, input video stream may be provided to video stream analyzers for classification. For example, a first video stream analyzer trained on soccer videos may be able to positively identify video input stream as being related to soccer and extract features and metadata from the input video stream, whereas a second video stream analyzer trained for basketball may fail to identify any features or metadata, or may have low confidence in such determinations. In some embodiments, the determination or absence of facts and/or metadata from a video input stream by a video stream analyzer may be used to aid in the determining of an analyzer for an input video stream.

In at least one embodiment process 700 comprises a step to process 706 the input video stream using the selected analyzer to determine a set of metadata. The selected video stream analyzer may be utilized to determine facts and metadata from input video stream and in conjunction with fact sources. For example, and according to various embodiments, fact sources may include historical factual information on corner kicks and there may be a corner kick video stream analyzer trained to process video content for corner kicks and generate facts and metadata from video content of this specific type. Accordingly, when a corner kick is detected in input video stream, metadata from factual sources as well as metadata determined by the corner kick video stream analyzer may be overlapped and used to expose fats as to who scored on corner kicks, who performed assists, when those kicks occurred, who was the goalkeeper was, and so on. Associations may be made between various metadata points in a semantically coherent manner and combined to identify facts and intersections thereof that are meaningful and engaging to viewers.

Facts and metadata may be extracted from the input video stream by use of a suitable video stream analyzer (e.g., selected from a plurality of video stream analyzers based on input type registry) and background fact provided by fact sources. Facts and metadata may be formatted with time dimension of the facts and metadata correlated in the manner depicted in FIGS. 5 and 6. For example, facts and metadata may be extracted so that they exist outside of the time dimension. For example, a segment of a video stream may be analyzed to determine that from 00:01 to 00:04, the ball is being thrown in. This information may be correlated along the time dimension by creating a first metadata graph node corresponding to the factual information, namely, that the ball is being thrown in, and that first metadata graph node may have an outward edge to a second metadata graph node corresponding to the time information indicating that the fact is contextually relevant over the 00:01 to 00:04 time window.

In at least one embodiment process 700 comprises a step to recursively train 708 one or more machine learning models to determine a relationship graph for the set of metadata. Relationships between facts and original input may be created and packaged as new input in a recursive manner. Models may be trained to determine contextual relationships with various topics. For example, a first machine learning model may be trained to determine first contextual information from a sub-phrase related to the "World Cup" topic and a second machine learning model may be trained to determine contextual information related to the "countries" topic. A feature such as "teams" may generally refer to a broad set of teams but may be constrained based on segmentation. Model NLP engines may be segmented based on topic, such that "team" may refer to teams of a specific sport or topic (e.g., all soccer teams, all soccer teams within a specific league, and so on) rather than being so broad as to cover all teams across all sports. The topic-specific nature of the frameworks may be used as a refinement mechanism that enables greater prediction accuracy and results to be generated in response to user questions and commands.

As part of a training iteration, a system performing process 700 may determine an input (e.g., question) and an expected output (e.g., answer). A graph query may be generated that encodes the semantic meaning of the input. For example, an input question may be "Did PlayerX score a goal with a header?" and the input question may be parsed to determine semantic meaning that is encoded as a graph query. The graph query may be encoded as:

G.V(PlayerX).out(playerAction).has(actionType:header). out(ball).out(goalAttempt).has(scored=True)

Conceptually, this indicates a graph traversal from PlayerX to a player action indicating a header action that is traversed to a ball and then traversed to a goal attempt that was successfully scored. The predicted answer may be based on whether the graph query was successfully traversed. Predicted output may be compared against expected output and used to update or refine parameter weights for the machine learning model.

When an initial set of facts are generated, they are used in a feedforward recursive system with a max recursion or max order, wherein the output generated from a first iteration is used as the input until a max order has been reached. In some cases, the recursive system terminates when there is no more complexity that can be extracted from the system. In various embodiments, the recursion terminates when no additional transforms are possible. Relationships may be represented as directed edges that connect one piece of metadata with another by time segment. Metadata graphs may encode relationships between various metadata nodes, for example, as discussed in connection with FIGS. 5 and 6. Metadata graphs may be traversed to determine the relationship between different nodes, which may refer to factual information, time series information, etc., to determine what information may be relevant in relation to phrases or sub-phrases spoken by a user.

Once this information is fed into the system performing process 700, a level of abstraction attempts to refine the input to its most granular information by running it through an analyzer which can be loaded with any other model or algorithm, to produce a set of raw images or notions. These fragments of information can exist outside of the time dimension of the segment or may intersect with the time dimension non-linearly. Some of these metadata may make sense when applied to their factual context. When consuming these fragments, any N variety of analyzers can be registered (e.g., by a human user with an expected input and output) and after multiple processing iterations, generate a dynamic metadata graph that expresses rich relationship between the data. Individual metadata for facts may be semantically linked to other metadata or facts by using analyzers to determine edges between two or more metadata or facts. Metadata or facts may be interrelated at specific time segments. The metadata graph may be implemented in accordance with techniques described in connection with FIGS. 4 and 5 and elsewhere in this disclosure.

Figure 8:
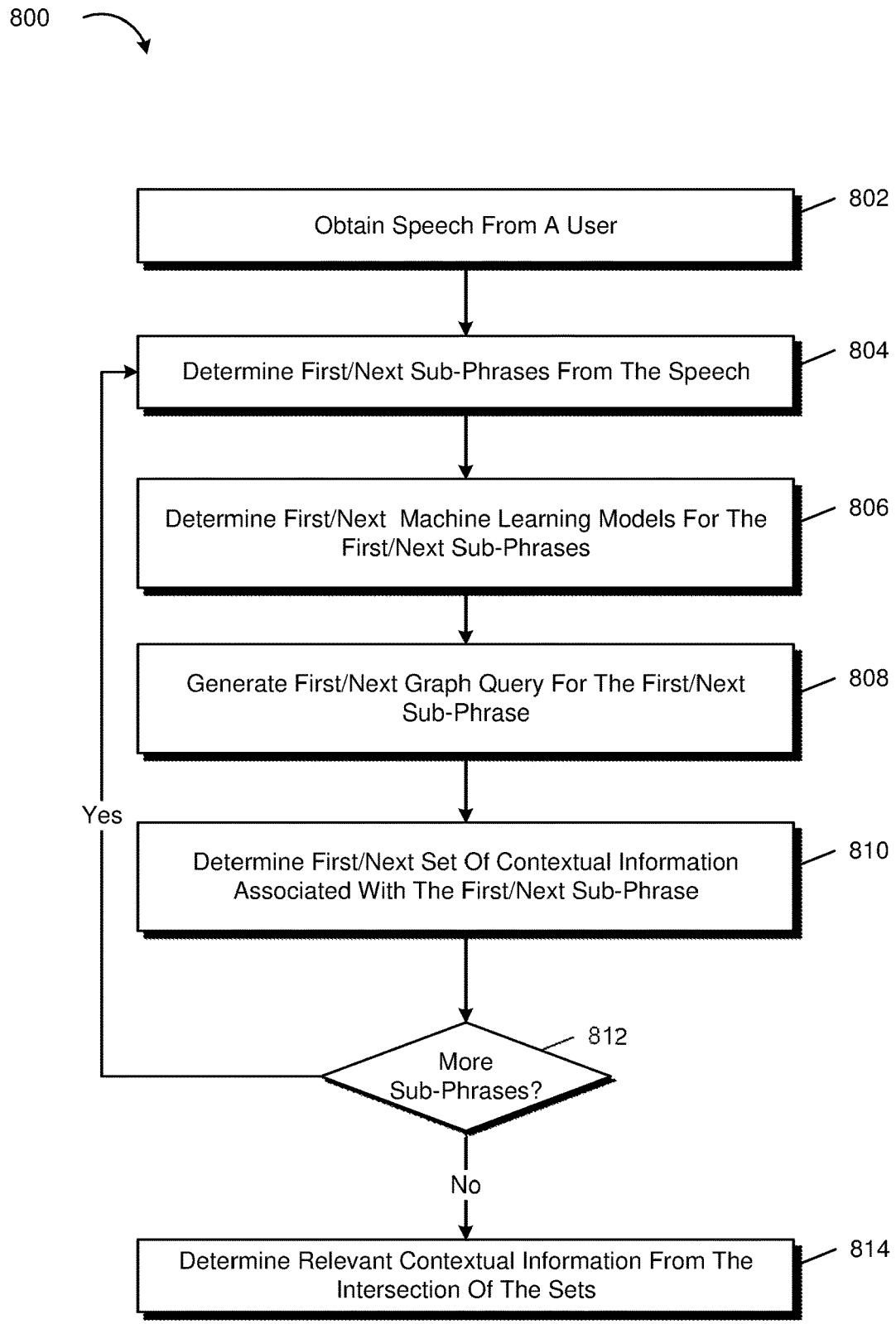
FIG. 8 shows an illustrative example of a process for determining relevant contextual information, in accordance with one or more example embodiments of the present disclosure.

FIG. 8 shows an illustrative example of a process 800 for determining relevant contextual information, in accordance with one or more example embodiments of the present disclosure. In at least one embodiment, some or all of the process 800 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 800 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 800 may be implemented in the context of various systems and methods described elsewhere in this disclosure, such as those discussed in connection with FIGS. 1, 5, 6, and 9. In at least one embodiment, process 800 or a portion thereof is implemented by a computing resource service provider.

In at least one embodiment process 800 comprises a step to obtain 802 speech from a user.

In at least one embodiment, process 800 comprises a step to determine 804 a first sub-phrase from the speech. In at least one embodiment process 800 comprises a routine for processing the obtained speech using NLP techniques to identify one or more sub-phrases. Each sub-phrase may have discrete and semantic meanings and may be individually parseable by an appropriate model. Sub-phrases may be parsed individually or in parallel. A sub-phrase may be a contiguous or non-contiguous portion of the speech.

In at least one embodiment, process 800 comprises a step to determine 806 a first machine learning model for the first sub-phrase. The first machine learning model may be trained on a first topic that is semantically similar to the first sub-phrase. For example, the first sub-phrase may include a word relating to the topic that the first machine learning model is trained on. The first machine learning model may be trained according to the first topic and may be selected based on the first sub-phrase being semantically related to the first topic.

In at least one embodiment, process 800 comprises a step to generate 808, a first graph query for the first sub-phrase. In various embodiments, the machine learning model is trained against a graph query such as a gremlin query. Natural language processing may be used to translate a phrase (e.g., spoken question) into a gremlin query that is used for graph traversal. A user may ask a soccer-related question such as "Which countries have won the World Cup?" An NLP engine may be used to parse the question. NLP engine may be implemented using any suitable speech and/or user recognition system that extracts semantic meaning from speech audio. NLP engine may be implemented as a speech recognition model that is trained using audio data from user. NLP engine may be in accordance with one or more NLP engines described in connection with FIG. 1. In some embodiments, NLP engine is trained to parse sports-specific speech, such as soccer-related questions and trivia. An input video stream may be processed by an appropriate analyzer and graph may be generated with all relevant facts and metadata determined to be relevant. In at least one embodiment, NLP engine determines the constituent parts of speech and generates a corresponding graph or Gremlin query. For example, the question "Which countries have won the World Cup?" from speech may have various constituent parts, such as countries, action ("won"), event ("World Cup"), and more. The semantic meaning of the speech may be parsed by NLP engine to generate a graph query.

In at least one embodiment, process 800 comprises a step to determine 810 a first set of contextual information associated with the first sub-phrase. A first machine learning model may be used to traverse a metadata graph to determine the first set of contextual information relating to the first topic. For example, nodes of the metadata graph may include information obtained from a live video stream, which may be supplemented by additional information obtained from other fact sources, which may include additional historical facts that may be used to process queries.

In at least one embodiment, step 812 indicates that steps 804-810 are to be performed for each sub-phrase extracted from the speech input. In at least some embodiments, steps 804-810 are executed in parallel to determine a set of contextual information for each sub-phrase.

In at least one embodiment, process 800 comprises a step to determine 814 relevant contextual information from the intersection of the sets of contextual information. For example, the intersection of two or more sets of contextual information may be the relevant contextual information. As a concrete example, if a user asks "Which countries have won the World Cup?" a first set of contextual information may be based on the "World Cup" topic and include related information and a second set of contextual information may include a list of "countries" and the intersection of these two sets of contextual information may be used to determine which countries have participated in the World Cup. Further intersection may refine the relevant contextual information—for example, a third set of contextual information relating to "won" may indicate winners of various soccer events and intersection with this third set of contextual information may be used to identify which countries have won the World Cup.

The examples presented herein are not meant to be limiting.

Figure 9:
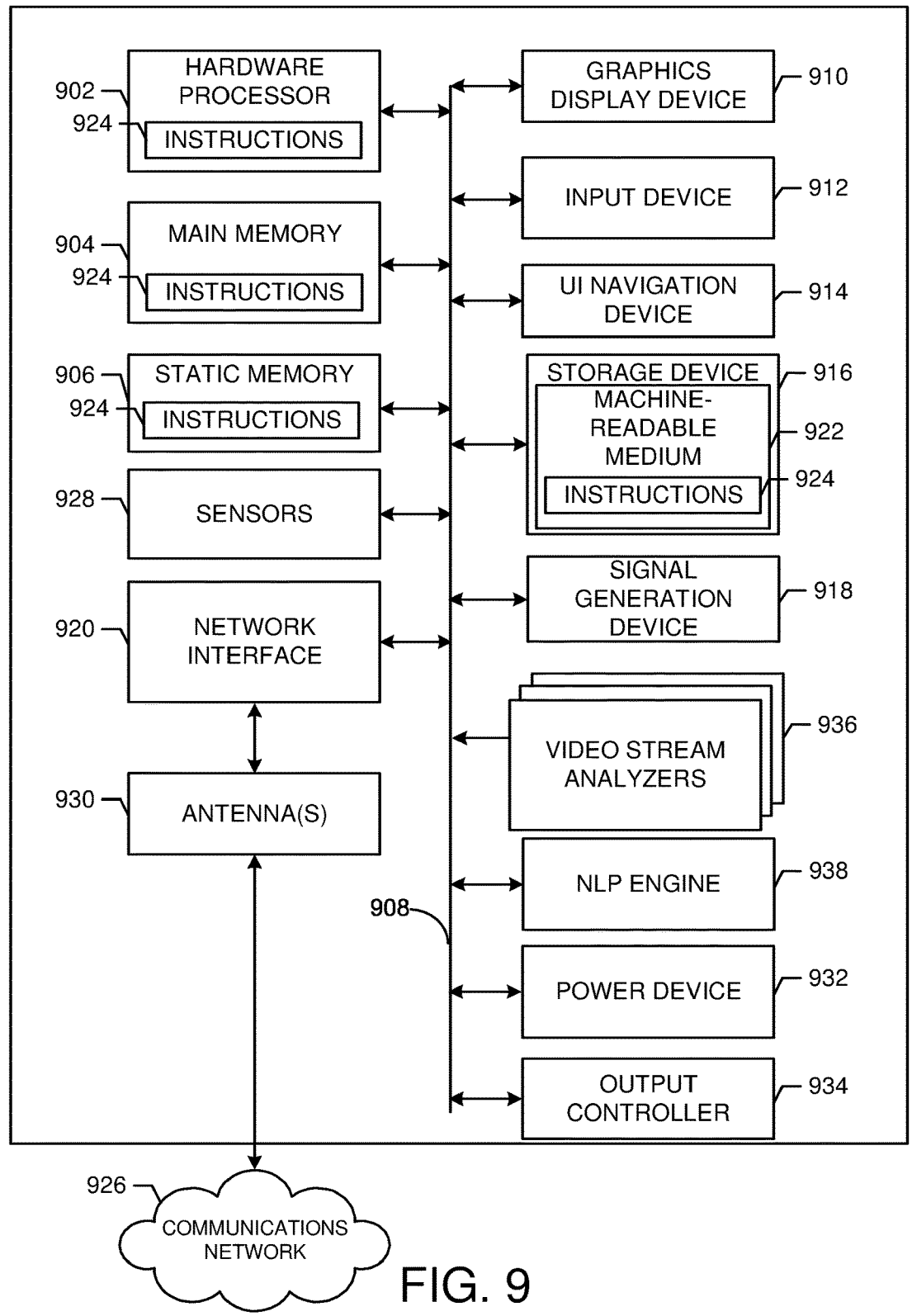
FIG. 9 illustrates a block diagram of an example machine upon which any of one or more techniques (e.g., methods) may be performed, in accordance with one or more example embodiments of the present disclosure.

FIG. 9 illustrates a block diagram of an example of a machine 900 (e.g., implemented in whole or in part in the context of embodiments described in connection with other figures. In some embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in Wi-Fi direct, peer-to-peer (P2P) (or other distributed) network environments. The machine 900 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include any combination of the illustrated components. For example, the machine 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (e.g., drive unit) 916, a signal generation device 918, and a network interface device/transceiver 920 coupled to antenna(s) 930. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

While the machine-readable medium 922 is illustrated as a single medium, the term "machine-readable medium" may include a single medium or multiple media (e.g., a centralized or distributed database, and/or associated caches and servers) configured to store the one or more instructions 924.

In at least one embodiment, video stream analyzers 936 are in accordance with those described elsewhere, for example, in connection with FIG. 4. Video stream analyzers may be utilized to process input video streams and generate metadata graphs that are used to train machine learning models to traverse metadata graphs based on user commands or questions. Different machine learning models may be trained to process different topics. A phrase, such as a question presented by a user, may contain various subphrases. In some embodiments, NLP engine 938 is in accordance with those described elsewhere as in connection with FIG. 1. NLP engines may utilize machine learning models to identify sets of contextual information that may be aggregated to determine relevant contextual information, such as a predicted answer to a user's question.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that causes the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method, comprising:
    obtaining content for a video stream;
    determining an input type for the video stream;
    selecting a video stream analyzer based on the input type;
    processing the content using the video stream analyzer to determine a set of metadata associated with the video stream, wherein the set of metadata is correlated along a time dimension;
    generating a metadata graph based on the set of metadata and the video stream analyzer, wherein the metadata graph encodes relationships between a first metadata of the set of metadata and a second metadata of the set of metadata;
    recursively training a first machine learning model using the metadata graph to determine contextual information associated with a first topic;
    recursively training a second machine learning model using the metadata graph to determine contextual information associated with a second topic;
    obtaining speech input from a user;
    parsing the speech input to determine at least a first sub-phrase and a second sub-phrase;
    determining, using the first machine learning model, first set of contextual information associated with the first sub-phrase;
    determining, using the second machine learning model, second set of contextual information associated with the second sub-phrase; and
    determining, based on the first set of contextual information associated with the first sub-phrase and the second set of contextual information associated with the second sub-phrase, relevant contextual information for the speech input.

2. The computer-implemented method of claim 1, wherein recursively training the first machine learning model comprises:
    determining an input and expected output;
    determining, based on the input, a graph query that encodes semantic meaning of the input;
    traversing the metadata graph according to the graph query to determine a predicted output; and
    updating weights of the first machine learning model based on a comparison of the expected output with the predicted output.

3. The computer-implemented method of claim 1, wherein recursively training the first machine learning model terminates based on a max order being reached.

4. The computer-implemented method of claim 1, further comprising:
    recursively training a third machine learning model using the metadata graph to determine contextual information associated with a third topic;
    parsing the speech input to further determine a third sub-phrase;
    determining, using the third machine learning model, third set of contextual information associated with the third sub-phrase; and
    determining the relevant contextual information for the speech input is further based on the third set of contextual information.

5. The computer-implemented method of claim 1, wherein determining the relevant contextual information for the speech input comprises determining an intersection of the first set and the second set.

6. A system, comprising:
one or more processors; and
memory storing executable instructions that, as a result of execution by the one or more processors, cause the system to:
- determine a set of metadata associated with a video stream, wherein the set of metadata is correlated along a time dimension;
- generate a metadata graph for the video stream based on the set of metadata, wherein the metadata graph encodes relationships between a first metadata of the set of metadata and a second metadata of the set of metadata;
- train a plurality of machine learning models using the metadata graph, wherein a first machine learning model of the plurality of machine learning models is usable to determine contextual information associated with a first topic and a second machine learning model is usable to determine contextual information associated with a second topic;
- parse speech obtained from a user to determine a first sub-phrase;
- select, based on the first sub-phrase being semantically related to the first topic, the first machine learning model that is usable to determine contextual information associated with the first topic;
- determine, using the first machine learning model, a first set of contextual information associated with the first sub-phrase;
- determine, using the second machine learning model, a second set of contextual information associated with a second sub-phrase from the speech that is associated with the second topic;
- determine, based on the first set of contextual information associated with the first sub-phrase and the second set of contextual information associated with the second sub-phrase, relevant contextual information for the speech; and
- determine a response to the speech based on the relevant contextual information.

7. The system of claim 6, wherein the instructions include further instructions that, as a result of execution by the one or more processors, cause the system to further:
- parse the speech obtained from the user to determine a second sub-phrase; and
- select, based on the second sub-phrase being semantically related to a second topic, the second machine learning model.

8. The system of claim 6, wherein the instructions to train the first machine learning model include instructions that, as a result of execution by the one or more processors, cause the system to:
- determine an input and expected output;
- determine, based on the input, a graph query that encodes semantic meaning of the input;
- traverse the metadata graph according to the graph query to determine a predicted output; and
- update weights of the first machine learning model based on a comparison of the expected output with the predicted output.

9. The system of claim 8, wherein the first machine learning model of the plurality of machine learning models is recursively trained until a max order is reached.

10. The system of claim 8, wherein the first machine learning model is trained to converge through semi-supervised learning.

11. The system of claim 6, wherein the first machine learning model is selected for the sub-phrase based on the first topic being the sub-phrase.

12. The system of claim 6, wherein the set of metadata is determined based on a fact source.

13. A non-transitory computer-readable storage medium storing executable instructions that, as a result of being executed by one or more processors of a computer system, cause the computer system to at least:
- determine a set of metadata associated with a video stream, wherein the set of metadata is correlated along a time dimension;
- generate a metadata graph for the video stream based on the set of metadata, wherein the metadata graph encodes relationships between a first metadata of the set of metadata and a second metadata of the set of metadata;
- parsing speech obtained from a user to determine a first sub-phrases;
- determine that the first sub-phrase is semantically related to a first topic;
- select a first machine learning model of a plurality of machine learning models, wherein the first machine learning model comprises a set of weights trained based on the metadata graph and the video stream to determine contextual information associated with the first topic, wherein the plurality of machine learning models includes a second machine learning model that comprises a second set of weights trained based on the metadata graph and the video stream to determine contextual information associated with a second topic;
- determine, using the first machine learning model, a first set of contextual information associated with the first sub-phrase;
- determine, using the second machine learning model, a second set of contextual information associated with a second sub-phrase from the speech that is associated with the second topic;
- determine, based on the first set of contextual information associated with the first sub-phrase and the second set of contextual information associated with the second sub-phrase, relevant contextual information for the speech; and
- determine a response to the speech based on the relevant contextual information.

14. The non-transitory computer-readable storage medium of claim 13, wherein the instructions include further instructions that, as a result of execution by the one or more processors, cause the computer system to further:
- parse the speech obtained from the user to determine a second sub-phrase;
- select, based on the second sub-phrase being semantically related to a second topic, the second machine learning model.

15. The non-transitory computer-readable storage medium of claim 13, wherein the instructions to determine the relevant contextual information, as a result of being executed by the one or more processors of the computer system, further cause the system to determine an intersection of the first set and the second set.

16. The non-transitory computer-readable storage medium of claim 13, wherein the instructions to train the first machine learning model include instructions that, as a result of execution by the one or more processors, cause the computer system to:
- determine an input and expected output;

determine, based on the input, a graph query that encodes semantic meaning of the input;

traverse the metadata graph according to the graph query to determine a predicted output; and update the set of weights of the first machine learning model based on a comparison of the expected output with the predicted output.

17. The non-transitory computer-readable storage medium of claim 16, wherein the first machine learning model of the plurality of machine learning models is recursively trained until a max order is reached.

18. The non-transitory computer-readable storage medium of claim 13, wherein the first machine learning model is selected for the sub-phrase based on the first topic being the sub-phrase.

19. The non-transitory computer-readable storage medium of claim 13, wherein the metadata graph comprises a graph node corresponding to a time segment of the video stream.

20. The non-transitory computer-readable storage medium of claim 19, wherein an outward edge from the graph node connects the graph node to a second graph node corresponding to an event that occurred during the time segment.

* * * * *